(12) United States Patent
Yoshitomi (10) Patent No.: US 11,456,478 B2
(45) Date of Patent: Sep. 27, 2022

(54) FUEL CELL SYSTEM WITH AUXILIARY DEVICE CASE

(71) Applicant: HONDA MOTOR CO., LTD., Tokyo (JP)

(72) Inventor: Ryoichi Yoshitomi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 356 days.

(21) Appl. No.: 16/680,551

(22) Filed: Nov. 12, 2019

(65) Prior Publication Data

US 2020/0161692 A1 May 21, 2020

(30) Foreign Application Priority Data

Nov. 16, 2018 (JP) .............................. JP2018-215233

(51) Int. Cl.
*H01M 8/2475* (2016.01)
*H01M 8/04* (2016.01)
(Continued)

(52) U.S. Cl.
CPC ............. *H01M 8/2475* (2013.01); *B60K 1/04* (2013.01); *H01M 8/04* (2013.01); *H01M 8/1004* (2013.01);
(Continued)

(58) Field of Classification Search
CPC .. H01M 8/2475; H01M 8/04; H01M 8/04201; H01M 8/1004; H01M 8/2457;
(Continued)

(56) References Cited

U.S. PATENT DOCUMENTS 8,415,060 B2 * 4/2013 Fukuma ............ H01M 8/04089
429/413
8,859,136 B2 * 10/2014 Fujisawa ............. H01M 8/2457
429/163

(Continued)

FOREIGN PATENT DOCUMENTS

JP      2004-186029          7/2004
JP      2013206855 A  *  10/2013
WO    WO-2012141303 A1 * 10/2012  .......... H01M 8/0612

OTHER PUBLICATIONS

JP2013206855A machine translation of document into English. Inventor: Seishi Yoshinaga, Titile: "Fuel cell system", Date: Dec. 14, 2021, retrieved from https://worldwide.espacenet.com/ (Year: 2021).*

(Continued)

*Primary Examiner* — Matthew T Martin
*Assistant Examiner* — Jared Hansen
(74) *Attorney, Agent, or Firm* — Amin, Turocy & Watson, LLP (57) ABSTRACT

A fuel cell system includes a stack case storing a fuel cell stack, and an auxiliary device case containing a fuel gas system device and an oxygen-containing gas system device. The auxiliary device case covers the fuel gas system device in a manner to protect the fuel gas system device against the external load, and includes a first case member provided with a mount fixed to a vehicle body frame, and a second case member made of material having specific gravity smaller than that of the first case member, and covers at least the oxygen-containing gas system device.

13 Claims, 8 Drawing Sheets

(51) Int. Cl.
　　　*B60K 1/04*　　　(2019.01)
　　　*H01M 8/1004*　　(2016.01)
　　　*H01M 8/10*　　　(2016.01)
(52) U.S. Cl.
　　　CPC ............... *H01M 2008/1095* (2013.01); *H01M 2250/20* (2013.01)
(58) Field of Classification Search
　　　CPC ...... H01M 2008/1095; H01M 2250/20; B60K 1/04; B60K 2001/0411; B60Y 2400/202; B60Y 2410/10; Y02E 60/50; Y02T 10/70; Y02T 10/7072; Y02T 90/14
　　　See application file for complete search history.

(56) References Cited

U.S. PATENT DOCUMENTS

| | | | | |
|---|---|---|---|---|
| 2003/0152815 | A1* | 8/2003 | LaFollette | H01M 50/10 429/7 |
| 2005/0214628 | A1* | 9/2005 | Pristash | H01M 8/2475 429/444 |
| 2007/0154767 | A1* | 7/2007 | Kimura | H01M 8/04208 429/509 |
| 2009/0047560 | A1* | 2/2009 | Negishi | H01M 8/1009 429/421 |
| 2015/0244006 | A1* | 8/2015 | Yoshitomi | H01M 8/04201 429/446 |
| 2017/0331124 | A1* | 11/2017 | Ko | H01M 8/2475 |

OTHER PUBLICATIONS

WO2012141303A1 machine translation of document into English. Inventor: Yamamoto Satoru, Title: "Fuel cell module", Date: Dec. 21, 2021, retrieved from https://worldwide.espacenet.com/ (Year: 2021).*

Engineering Tool Box. Modulus of Rigidity, https://www.engineeringtoolbox.com/modulus-rigidity-d_946.html [Accessed Dec. 21, 2021], archived page from May 8, 2006 https://web.archive.org/web/20060508165055/https://www.engineeringtoolbox.com/modulus-rigidity-d_946.html (Year: 2005).*

* cited by examiner

FUEL CELL SYSTEM WITH AUXILIARY DEVICE CASE

CROSS-REFERENCE TO RELATED APPLICATION

This application is based upon and claims the benefit of priority from Japanese Patent Application No. 2018-215233 filed on Nov. 16, 2018, the contents of which are incorporated herein by reference.

BACKGROUND OF THE INVENTION

Field of the Invention

The present invention relates to a fuel cell system including an auxiliary device case.

Description of the Related Art

For example, a solid polymer electrolyte fuel cell includes a membrane electrode assembly (MEA) formed by providing an anode on one surface of an electrolyte membrane, and a cathode on the other surface of the electrolyte membrane. The electrolyte membrane is a polymer ion exchange membrane. A power generation cell (unit cell) is formed by sandwiching the membrane electrode assembly between separators. Normally, a predetermined number of power generation cells are stacked together to form an in-vehicle fuel cell stack, e.g., mounted in a fuel cell vehicle.

In the in-vehicle fuel cell stack, it has been customary to adopt structure where a stack body formed by stacking a predetermined number of power generation cells is stored in a stack case. In this case, it is assumed that a hydrogen gas may be leaked out of, e.g., gaps of the stack body, in the stack case. Therefore, it has been proposed to provide a ventilating mechanism for introducing the air from the outside into a stack case to ventilate the inside of the stack case, to keep concentration of a hydrogen gas at a certain level or less, even if leakage of the hydrogen gas occurs in the stack case (see, e.g., Japanese Laid-Open Patent Publication No. 2004-186029).

However, in consideration of ventilation in the case where the fuel gas is leaked out of fuel cell auxiliary devices (fuel gas system devices and oxygen-containing gas system devices), protection of the fuel gas system devices when an external load is applied, and mounting to a vehicle body frame, it is considered to attach an auxiliary device case having these functions (ventilation function, protection function, mounting function) to the stack case.

However, in the case of forming the entire auxiliary device case which satisfies the strength required for such functions of the auxiliary device case by molding, the weight and the size of the auxiliary device case become large, and production becomes difficult disadvantageously.

SUMMARY OF THE INVENTION

An object of the present invention is to provide a fuel cell system including an auxiliary device case having a function of protecting a fuel gas system device when an external load is applied to the auxiliary device case, a ventilating function of a fuel gas, and a mounting function of mounting the auxiliary device case to the vehicle body frame, and achieve weight reduction effectively.

In order to achieve the above object, according to an embodiment of the present invention, a fuel cell system is provided. The fuel cell system includes a fuel cell stack, a stack case configured to store the fuel cell stack, a fuel gas system device and an oxygen-containing gas system device as fuel cell auxiliary devices, and an auxiliary device case fixed to the stack case and configured to store the fuel gas system device and the oxygen-containing gas system device, and having a ventilating function, wherein the auxiliary device case includes a first case member configured to cover the fuel gas system device in a manner to protect the fuel gas system device against an external load, and provided with a mount fixed to a vehicle body frame, and a second case member made of material having specific gravity smaller than that of the first case member, and configured to cover at least the oxygen-containing gas system device.

In the fuel cell system according to the present invention, the auxiliary device case having the ventilating function covers the fuel gas system device and the oxygen-containing gas system device to achieve the ventilating function, and the first case member having high rigidity provided with the mount covers the fuel gas system device to protect the fuel gas system device against the external load. Further, since the auxiliary device case is at least partially formed by the second case member having relatively lightweight, it is possible to contribute weight reduction of the fuel cell system. Therefore, in the fuel cell system, it is possible to provide the auxiliary device case with the function of protecting the fuel gas system device when the external load is applied to the auxiliary device case, the function of ventilating the fuel gas, and the function of mounting the auxiliary device case to the vehicle body frame, and moreover, achieve weight reduction effectively.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
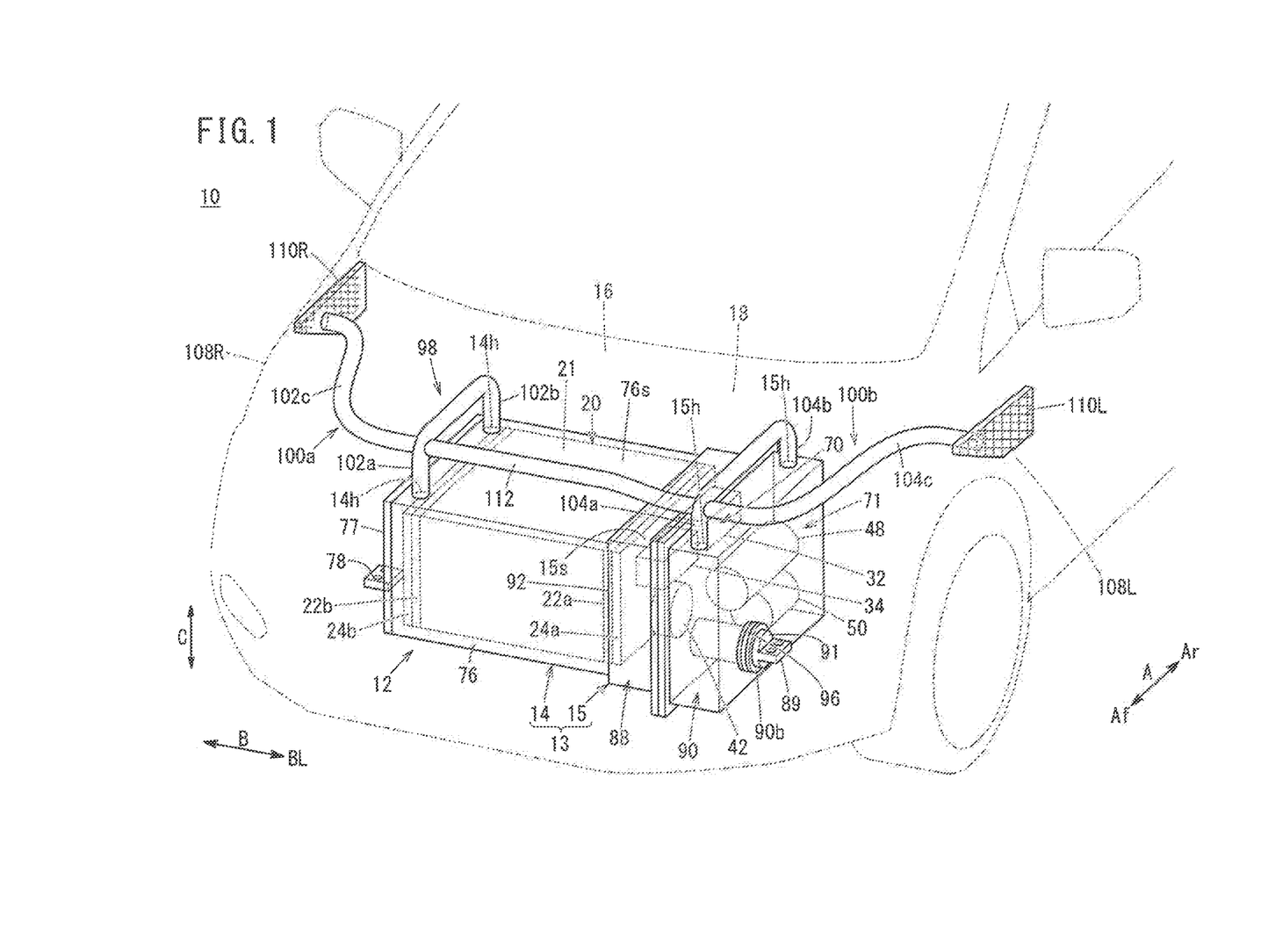
FIG. 1 is a perspective view showing a fuel cell vehicle equipped with a fuel cell system according to an embodiment of the present invention.

As shown in FIG. 1, a fuel cell vehicle 10 including a fuel cell system 12 according to an embodiment of the present invention is, e.g., a fuel cell electric automobile. In the following description, the upper side (upper part) means the upper side (upper part) in the vertical direction. The lower side (lower part) means the lower side (lower part) in the vertical direction. In the fuel cell vehicle 10, a stack case 14 storing a fuel cell stack 20 is provided in a front room (motor room) formed on the front side (in a direction indicated by an arrow Af) of a dashboard 16. Therefore, the fuel cell stack 20 is disposed under a hood 18.

The fuel cell stack 20 includes a cell stack body 21 formed by stacking a plurality of flat plate type power generation cells in a vehicle width direction (indicated by an arrow B). The plurality of power generation cells may be stacked together in the vertical direction (indicated by an arrow C). The plurality of power generation cells may be stacked together in a vehicle front/rear direction (indicated by an arrow A). A first terminal plate 22a is provided at one end of the cell stack body 21 in the stacking direction. A first insulating plate 24a is provided outside the first terminal plate 22a. A second terminal plate 22b is provided at the other end of the cell stack body 21 in the stacking direction, and a second insulating plate 24b is provided outside the second terminal plate 22b.

The fuel cell system 12 includes the stack case 14 storing the fuel cell stack 20, and an auxiliary device case 15 storing fuel cell auxiliary devices. The stack case 14 and the auxiliary device case 15 form a case unit 13. The case unit 13 made up of the stack case 14 and the auxiliary device case 15 has a quadrangular shape (rectangular shape having the long sides extending in the vehicle width direction) in a plan view.

The stack case 14 includes a box shaped case body 76 having a left opening and a right opening, and a side panel 77 which closes the right opening of the case body 76. The case body 76 has a quadrangular shape in a plan view. A rear mount (not shown) is provided on the lower rear side of the case body 76. The rear mount is fixed to the vehicle body frame using fixing parts such as bolts. The side panel 77 also serves as one of end plates for applying a tightening load to the fuel cell stack 20 in the stacking direction. The side panel 77 has a mount 78 fixed to a vehicle body frame using fixing parts such as bolts. A seal member (not shown) made of elastic material is disposed between the case body 76 and the side panel 77, over the entire periphery of joint surfaces of the case body 76 and the side panel 77.

Holes 14h are formed at two corners of an upper part of the case body 76 (in the illustrated embodiment, an upper surface 76s of the case body 76 in the vertical direction) opposite to the side of the case body 76 to which the auxiliary device case 15 is connected. The holes 14h connect the stack case 14 to the outside.

The auxiliary device case 15 is a protection case for protecting the fuel cell auxiliary devices. The auxiliary device case 15 is provided adjacent to the stack case 14 in a horizontal direction, and joined to the stack case 14. As the fuel cell auxiliary devices, a fuel gas system device 70 and an oxygen-containing gas system device 71 are stored in the auxiliary device case 15. The fuel gas system device 70 stored in the auxiliary device case 15 includes an injector 32, an ejector 34, a hydrogen pump 42, and valves (not shown). The oxygen-containing gas system device 71 stored in the auxiliary device case 15 includes an air pump 48, a humidifier 50, etc. The fuel gas system device 70 is disposed between the fuel cell stack 20 and the oxygen-containing gas system device 71.

The auxiliary device case 15 includes a first case member 88 provided adjacent to the stack case 14, and a second case member 90 joined to the first case member 88. The fuel gas system device 70 is stored in the first case member 88. The oxygen-containing gas system device 71 is stored in the second case member 90. Holes 15h are formed in an upper part of the auxiliary device case 15 (in the illustrated embodiment, an upper surface 15s in the vertical direction). The holes 15h connect the auxiliary device case 15 to the outside. Specifically, the holes 15h are formed in the second case member 90.

The first case member 88 covers the fuel gas system device 70 in a manner to protect the fuel gas system device 70 against the external load, and the first case member 88 is provided with a mount 89 fixed to the vehicle body frame using fixing parts such as bolts. The first case member 88 is fixed to the stack case 14, and has a box shape storing the fuel gas system device 70. The first case member 88 is made of metal material (e.g., aluminum alloy) for having strength/rigidity enough to realize a function of protecting the fuel gas system device 70 against the external load, and a function of fixing the case unit 13 to the vehicle body frame.

The first case member 88 is joined to the left end of the case body 76 using fixing parts such as bolts. A seal member (not shown) made of elastic material is disposed between the case body 76 and the first case member 88, over the entire periphery of joint surfaces of the case body 76 and the first case member 88. The first case member 88 also serves as the other end plate which applies the tightening load to the fuel cell stack 20 in the stacking direction. The position of the first case member 88 is determined in a manner that the first case member 88 does not interfere with structure around the auxiliary device case 15 when the auxiliary device case 15 moves relative to the vehicle body frame as a result of application of an external load from the vehicle front side.

Figure 2:
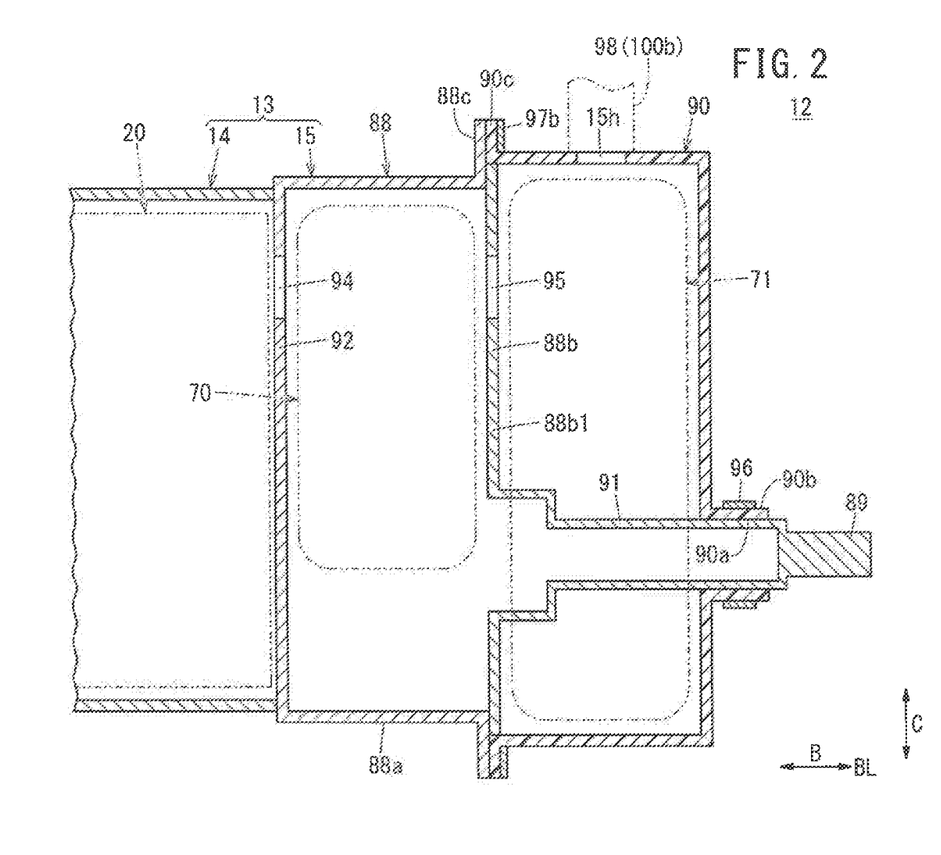
FIG. 2 is a view showing structure of an auxiliary device case.

As shown in FIG. 2, a wall 92 of the first case member 88 divides internal space of the stack case 14 and internal space of the auxiliary device case 15. Though not shown, the wall 92 of the first case member 88 has piping openings for inserting connection pipes into the piping openings, and these connection pipes are connected to an oxygen-containing gas supply passage, an oxygen-containing gas discharge passage, a fuel gas supply passage, a fuel gas discharge passage, a coolant supply passage, and a coolant discharge passage of the fuel cell stack 20, respectively.

The first case member 88 includes a recessed first case body 88a fixed to the stack case 14, and a cover body 88b fixed to the first case body 88a. The first case body 88a and the cover body 88b form a storage space storing the fuel gas system device 70. A ventilation passage 94 is provided in an upper part of the wall 92 for connecting the inner space of the stack case 14 and the inner space of the auxiliary device case 15. A ventilation passage 95 is formed in an upper part of the cover body 88b, for connecting the inner space of the first case member 88 and the inner space of the second case member 90.

The first case member 88 includes a projection 91 provided with the mount 89. The projection 91 protrudes from a base plate 88b1 of the cover body 88b in the horizontal direction. The mount 89 is provided at a protruding end of the projection 91. The projection 91 penetrates through the second case member 90, and the mount 89 is exposed from the second case member 90.

The second case member 90 is fixed to the first case member 88 in a manner to cover the oxygen-containing gas system device 71. The second case member 90 has a recessed shape, and has the depth in a direction away from the fuel cell stack 20 (indicated by an arrow BL). The second case member 90 is made of material (e.g., resin material or rubber material) having the specific gravity smaller than that of the first case member 88. The second case member 90 has low strength/low rigidity (fragile) in comparison with the first case member 88. The position of the second case member 90 is determined in a manner that the second case member 90 interferes with structure around the auxiliary device case 15 when the auxiliary device case 15 moves relative to the vehicle body frame as a result of application of the external load from the vehicle front side.

For example, the second case member 90 is made of poly vinyl chloride, polyethylene, polypropylene, cyclic polyolefin, polystyrene, poly-(4-methylpentene-1), polycarbonate, acrylic resin, etc. Further, for example, the second case member 90 is made of elastic material, e.g., seal material, cushion material, or packing material such as an EPDM, an NBR, a fluoro-rubber, a silicone rubber, a fluorosilicone rubber, a butyl rubber, a natural rubber, a styrene rubber, a chloroprene rubber, or an acrylic rubber.

An insertion hole 90a is formed in the second case member 90. The projection 91 of the first case member 88 is inserted into the insertion hole 90a of the second case member 90. A cylindrical wall 90b of the insertion hole 90a and a portion of the projection 91 at least inserted into the cylindrical wall 90b have a circular shape. An air-tight seal is formed between the cylindrical wall 90b and the projection 91. In the case where the second case member 90 is made of rubber, by tightening the outer circumferential portion of the cylindrical wall 90b using a band member 96, it is possible to form the air-tight seal between the cylindrical wall 90b and the projection 91. In the case where the second case member 90 is made of resin, an annular seal member made of elastic material is disposed between the cylindrical wall 90b and the projection 91 to form the air-tight seal. It should be noted that the cylindrical wall 90b and the portion of the projection 91 at least inserted into the cylindrical wall 90b are not limited to have a circular shape, and may have an oval shape or a quadrangular shape.

Figure 3:
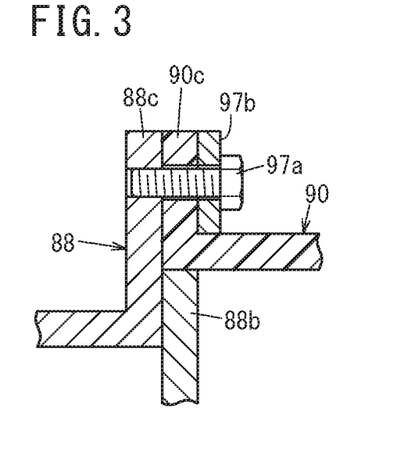
FIG. 3 is a view showing structure of joining a first case member and a second case member.

As shown in FIG. 3, the second case member 90 is joined to the first case member 88 using a bolt 97a. Specifically, the second case member 90 has a flange 90c over the entire periphery along the opening of the second case member 90. The flange 90c of the second case member 90 is held over the entire periphery, between a flange 88c provided over the entire periphery of the first case member 88 and a holder plate 97b. The holder plate 97b has a frame shape formed along the flange 90c of the second case member 90. The flange 90c of the second case member 90 and the holder plate 97b are tightened together to the first case member 88 using a plurality of the bolts 97a.

As shown in FIG. 1, an exhaust gas duct 98 is connected to an upper part of the case unit 13. In the case where the fuel gas is leaked out of the fuel cell stack 20 or the fuel cell auxiliary devices (the fuel gas system device 70 and the oxygen-containing gas system device 71), a fuel gas is discharged to the outside of the vehicle through the exhaust gas duct 98.

The exhaust gas duct 98 includes four connection pipes 102a, 102b, 104a, 104b. The four connection pipes 102a, 102b, 104a, 104b are connected to the holes 14h, 15h formed in the case unit 13, respectively. Specifically, the exhaust gas duct 98 includes a first duct 100a connected to the stack case 14, and a second duct 100b connected to the auxiliary device case 15. Though not shown, a ventilating air inlet hole is provided in the lower part of the stack case 14 and the lower part of the auxiliary device case 15, for supplying the ventilating air from the outside into the stack case 14. The stack case 14 and the auxiliary device case 15 have the above structure, and thus, have a ventilating function.

The first duct 100a includes the two connection pipes 102a, 102b connected to the two holes 14h of the stack case 14, and a merge pipe 102c into which the two connection pipes 102a, 102b are merged together. The merge pipe 102c is connected to a right exhaust gas port 110R provided for a right fender 108R. The second duct 100b includes two connection pipes 104a, 104b connected to the two holes 15h of the auxiliary device case 15, and a merge pipe 104c into which the two connection pipes 104a, 104b are merged together. The merge pipe 104c is connected to a left exhaust gas port 110L provided for a left fender 108L. The first duct 100a and the second duct 100b are connected together through a coupling pipe 112.

Figure 4:
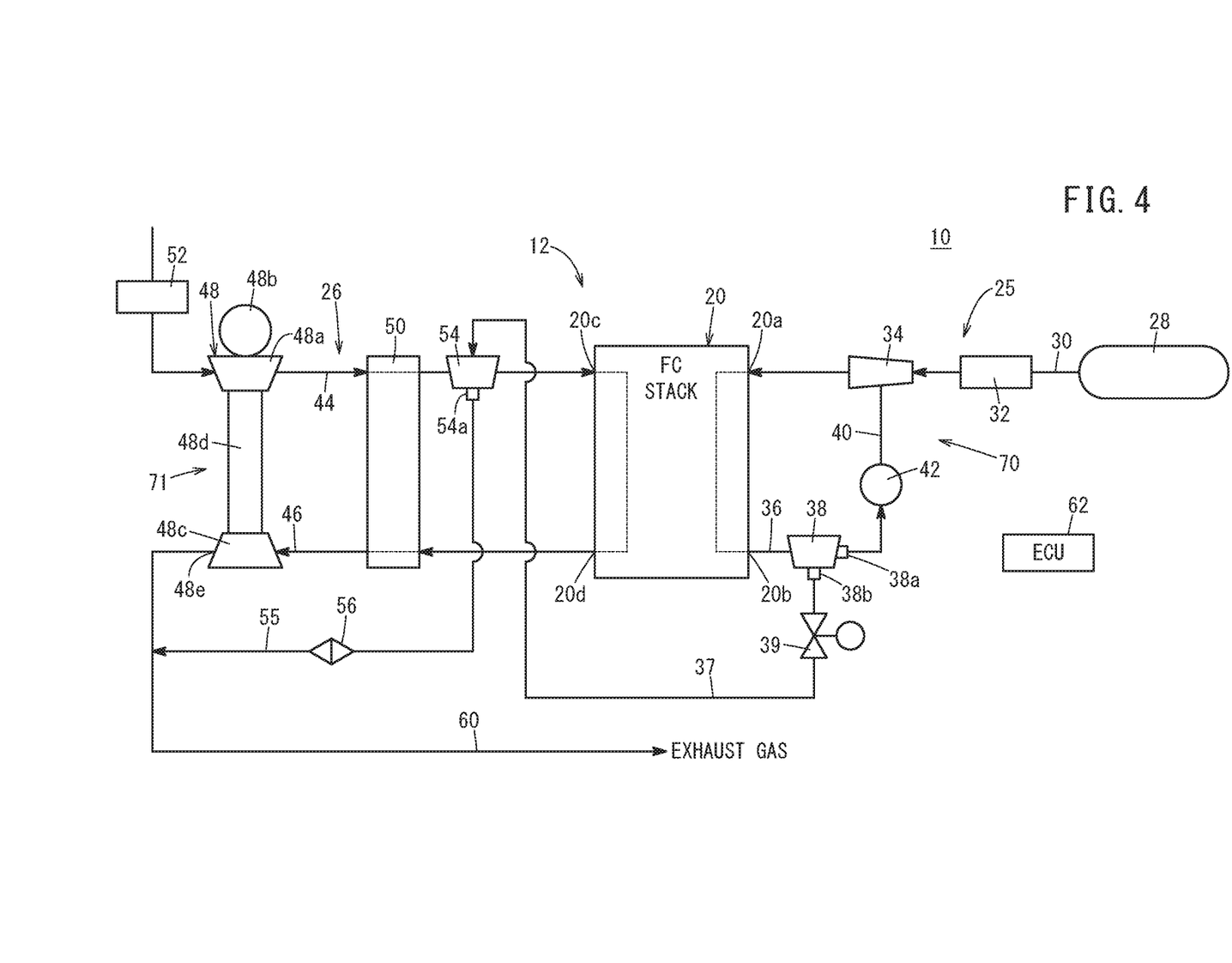
FIG. 4 is a diagram showing a fuel cell system.

As shown in FIG. 4, the fuel cell vehicle 10 includes the fuel cell system 12 having the fuel cell stack 20 for performing power generation using the fuel gas and the oxygen-containing gas, and an exhaust gas pipe 60 for discharging a cathode exhaust gas discharged from the fuel cell system 12 to the outside of the vehicle. Further, the fuel cell vehicle 10 includes electrical equipment such as an ECU (Electronic control unit) 62 and a traction motor operated using electrical energy generated in power generation of the fuel cell system 12 as a power source.

Further, the fuel cell system 12 includes a fuel gas supply apparatus 25 for supplying a fuel gas (e.g., hydrogen gas) to the fuel cell stack 20, and an oxygen-containing gas supply apparatus 26 for supplying the air as the oxygen-containing gas to the fuel cell stack 20. Though not shown, the fuel cell system 12 further includes a battery as an energy storage device, and a coolant supply apparatus for supplying a coolant to the fuel cell stack 20.

Each of the power generation cells of the fuel cell stack 20 includes a membrane electrode assembly, and a pair of separators sandwiching the membrane electrode assembly. The membrane electrode assembly is formed by disposing an anode, and a cathode on both surfaces of an electrolyte membrane (e.g., solid polymer electrolyte membrane). A fuel gas flow field is formed between the anode and one of the separators. An oxygen-containing gas flow field is formed between the cathode and the other of separators.

The fuel gas supply apparatus 25 includes a fuel gas tank 28 for storing a high pressure fuel gas (high pressure hydrogen), a fuel gas supply line 30 for guiding the fuel gas to the fuel cell stack 20, the injector 32 provided for the fuel gas supply line 30, and the ejector 34 provided downstream of the injector 32. A fuel gas inlet 20a of the fuel cell stack 20 is connected to the fuel gas supply line 30. A fuel gas injection device is formed by the injector 32 and the ejector 34.

A fuel gas discharge line 36 is connected to a fuel gas outlet 20b of the fuel cell stack 20. After some of the fuel gas is consumed at the anode of the fuel cell stack 20, the fuel gas is discharged as an anode exhaust gas (fuel off gas) from the fuel cell stack 20 through the fuel gas discharge line 36. A circulation line 40 is coupled to the fuel gas discharge line 36. The circulating line 40 guides the anode exhaust gas to the ejector 34. The hydrogen pump 42 (circulation pump) is provided in the circulation line 40. It should be noted that the hydrogen pump 42 may not be provided.

A gas liquid separator 38 is provided in the fuel gas discharge line 36. A connection line 37 is connected to a liquid discharge port 38b of the gas liquid separator 38. A water discharge valve 39 is provided for the connection line 37. The water discharge valve 39 is opened/closed under control of the ECU 62.

The oxygen-containing gas supply apparatus 26 includes an oxygen-containing gas supply line 44 connected to an oxygen-containing gas inlet 20c of the fuel cell stack 20, an oxygen-containing gas discharge line 46 connected to an oxygen-containing gas outlet 20d of the fuel cell stack 20, the air pump 48 for supplying the air toward the fuel cell stack 20, and the humidifier 50 for humidifying the air to be supplied to the fuel cell stack 20.

The air pump 48 includes a compressor 48a for compressing the air, a motor 48b for rotating the compressor 48a, and an expander 48c (regenerative mechanism) coupled to the compressor 48a. The air pump 48 is controlled by the ECU 62. The compressor 48a is provided in the oxygen-containing gas supply line 44. In the oxygen-containing gas supply line 44, an air cleaner 52 is provided upstream of the compressor 48a. The air is supplied into the compressor 48a through the air cleaner 52.

The expander 48c is provided in the oxygen-containing gas discharge line 46. An impeller of the expander 48c is coupled to an impeller of the compressor 48a through a coupling shaft 48d. The impeller of the compressor 48a, the coupling shaft 48d, and the impeller of the expander 48c rotate together about a rotation axis. The cathode exhaust gas is supplied into the impeller of the expander 48c to regenerate fluid energy from the cathode exhaust gas. The regenerative energy compensates for part of a driving force for rotating the compressor 48a.

The humidifier 50 has a large number of water permeable hollow fiber type membrane. In the hollow fiber type membrane, water component is exchanged between the air flowing toward the fuel cell stack 20 and the highly humidified cathode exhaust gas discharged from the fuel cell stack 20 to humidify the air flowing toward the fuel cell stack 20.

In the oxygen-containing gas supply line 44, a gas liquid separator 54 is provided between the humidifier 50 and the oxygen-containing gas inlet 20c of the fuel cell stack 20. The connection line 37 is connected to the gas liquid separator 54. One end of a drain pipe 55 is connected to a liquid exhaust port 54a of the gas liquid separator 54. The other end of the drain pipe 55 is connected to the exhaust gas pipe 60. An orifice 56 is provided in the drain pipe 55. The gas liquid separator 54 may not be provided. In the case where the gas liquid separator 54 is not provided, the connection line 37 may be connected directly to the oxygen-containing gas supply line 44.

The exhaust gas pipe 60 is connected to an outlet 48e of the expander 48c. The exhaust gas pipe 60 extends from the outlet 48e of the expander 48c, and extends along the vehicle body bottom part up to the vehicle body rear part.

Next, operation of the fuel cell system 12 having the structure as described above will be described.

During normal operation, the fuel cell system 12 is operated as follows. In FIG. 4, in the fuel gas supply apparatus 25, the fuel gas is supplied from the fuel gas tank 28 to the fuel gas supply line 30. At this time, the fuel gas is injected from the injector 32 toward the ejector 34. Then, the fuel gas flows from the fuel gas inlet 20a into the fuel gas flow field in the fuel cell stack 20 through the ejector 34, and then, the fuel gas is supplied to the anode.

In the meanwhile, in the oxygen-containing gas supply apparatus 26, under rotation operation of the air pump 48 (compressor 48a), the air as the oxygen-containing gas is supplied to the oxygen-containing gas supply line 44. After the air is humidified by the humidifier 50, the air flows from the oxygen-containing gas inlet 20c into the oxygen-containing gas flow field in the fuel cell stack 20, and the air is supplied to the cathode. In each of the power generation cells, the fuel gas supplied to the anode and the oxygen in the air supplied to the cathode are partially consumed in the electrochemical reactions in the electrode catalyst layer to perform power generation.

The fuel gas which has not been consumed at the anode is discharged as the anode exhaust gas, from the fuel gas outlet 20b into the fuel gas discharge line 36. The anode exhaust gas and the liquid water discharged from the anode flow into the gas liquid separator 38. The anode exhaust gas is separated from the liquid water in the gas liquid separator 38, and the anode exhaust gas flows into the circulation line 40 through a gas exhaust port 38a of the gas liquid separator 38. The liquid quantity in the gas liquid separator 38 is adjusted by opening/closing of the water discharge valve 39 based on an instruction from the ECU 62. It should be noted that the water discharge valve 39 is opened during stop of operation of the fuel cell stack 20, and liquid water in the gas liquid separator 38 is discharged to the gas liquid separator 54 provided in the oxygen-containing gas supply line 44 through the connection line 37, under the effect of the gravity. Liquid water is discharged from the gas liquid separator 54 to the outside of the vehicle through the drain pipe 55 and the exhaust gas pipe 60.

The anode exhaust gas flows from the fuel gas discharge line 36 into the ejector 34 through the circulation line 40. The anode exhaust gas which flowed into the ejector 34 is mixed with the fuel gas injected by the injector 32, and supplied to the fuel cell stack 20.

The highly humidified cathode exhaust gas containing the oxygen which has not been consumed at the cathode and the water produced in the reaction at the cathode are discharged from the oxygen-containing gas outlet 20d of the fuel cell stack 20 to the oxygen-containing gas discharge line 46. In the humidifier 50, water component is exchanged between the cathode exhaust gas and the air flowing toward the fuel cell stack 20, and thereafter, the cathode exhaust gas flows into the expander 48c of the air pump 48. In the expander 48c, energy is collected (regenerated) from the cathode exhaust gas, and then, regenerative energy is used as part of the driving force of the compressor 48a. The cathode exhaust gas and water are discharged from the expander 48c to the exhaust gas pipe 60, and discharged to the outside of the vehicle through the exhaust gas pipe 60.

At the time of starting operation of the fuel cell system 12, if it is determined that warming up of the fuel cell stack 20 is necessary based on the temperature of the ECU 62, warming up operation is performed before normal operation. During warming up operation, the water discharge valve 39 provided in the connection line 37 connected to the gas liquid separator 38 is opened by an instruction from the ECU 62. Then, as in the case of normal operation, the fuel gas is supplied to the anode of the fuel cell stack 20 by the fuel gas supply apparatus 25, and the oxygen-containing gas is supplied to the cathode of the fuel cell stack 20 by the oxygen-containing gas supply apparatus 26 to perform power generation.

Since the water discharge valve 39 is opened, the fuel gas is supplied into the oxygen-containing gas supply line 44 through the connection line 37. Therefore, the oxygen-containing gas and the fuel gas are supplied to the cathode of the fuel cell stack 20. As a result, exothermic reaction (catalyst combustion) occurs at cathode catalyst. By the heat produced in the exothermic reaction and the heat produced in the above power generation reaction, the fuel cell stack 20 is heated rapidly. Then, if it is determined that the temperature of the fuel cell stack 20 reaches the warming up completion temperature, the water discharge valve 39 is closed for switching to the normal operation described above.

In this case, the fuel cell system 12 offers the following advantages.

As shown in FIG. 1, in the fuel cell system 12, the auxiliary device case 15 having the ventilating function covers the fuel gas system device 70 and the oxygen-containing gas system device 71 to achieve the ventilating function, and the first case member 88 having high rigidity provided with the mount 89 covers the fuel gas system device 70 to protect the fuel gas system device 70 against the external load. Further, since the auxiliary device case 15 is at least partially formed by the second case member 90 having relatively light weight, it is possible to contribute weight reduction of the fuel cell system 12. Therefore, in the fuel cell system 12, the auxiliary device case can perform the function of protecting the fuel gas system device 70 when the external load is applied to the auxiliary device case 15, the function of ventilating the fuel gas, and the function of mounting the auxiliary device case 15 to the vehicle body frame, and achieve weight reduction effectively.

The first case member 88 is fixed to the stack case 14, and has a box shape configured to store the fuel gas system device 70. The second case member 90 is fixed to the first case member 88 in a manner to cover the oxygen-containing gas system device 71. In the structure, while achieving the desired strength of the first case member 88 easily, it is possible to achieve weight reduction of the auxiliary device case 15.

The first case member 88 is made of metal, and the second case member 90 is made of rubber or resin. In the structure, in comparison with the case where the entire auxiliary device case 15 is made of metal, it becomes possible to achieve significant weight reduction.

The first case member 88 includes the projection 91 provided with the mount 89. The second case member 90 has the insertion hole 90a, and the projection 91 is inserted into the insertion hole 90a. The air-tight seal is formed between the projection 91 and the cylindrical wall 90b forming the insertion hole 90a. In the structure, it is possible to seal the position where the projection 91 is inserted in the second case member 90, and expose the mount 89 to the outside of the second case member 90 easily.

The second case member 90 has low rigidity in comparison with the first case member 88, and the position of the second case member 90 is determined in a manner that the second case member 90 interferes with structure around the auxiliary device case 15 when the auxiliary device case 15 moves relative to the vehicle body frame as a result of application of the external load. In the structure, when the external load is applied, the second case member 90 interferes with the surrounding structure and is deformed or damaged. Thus, it becomes possible to achieve the target stroke of the auxiliary device case 15, determined for relieving impact when the external load is applied.

That is, when the external load is applied, the second case member 90 collides with the surrounding structure, and the second case member 90 (and the oxygen-containing gas system device 71 stored in the second case member 90) are broken. As a result, the case unit 13 storing the fuel cell stack 20 can reach the target stroke. Accordingly, energy is absorbed effectively, and it is possible to relieve the impact effectively.

Figure 5:
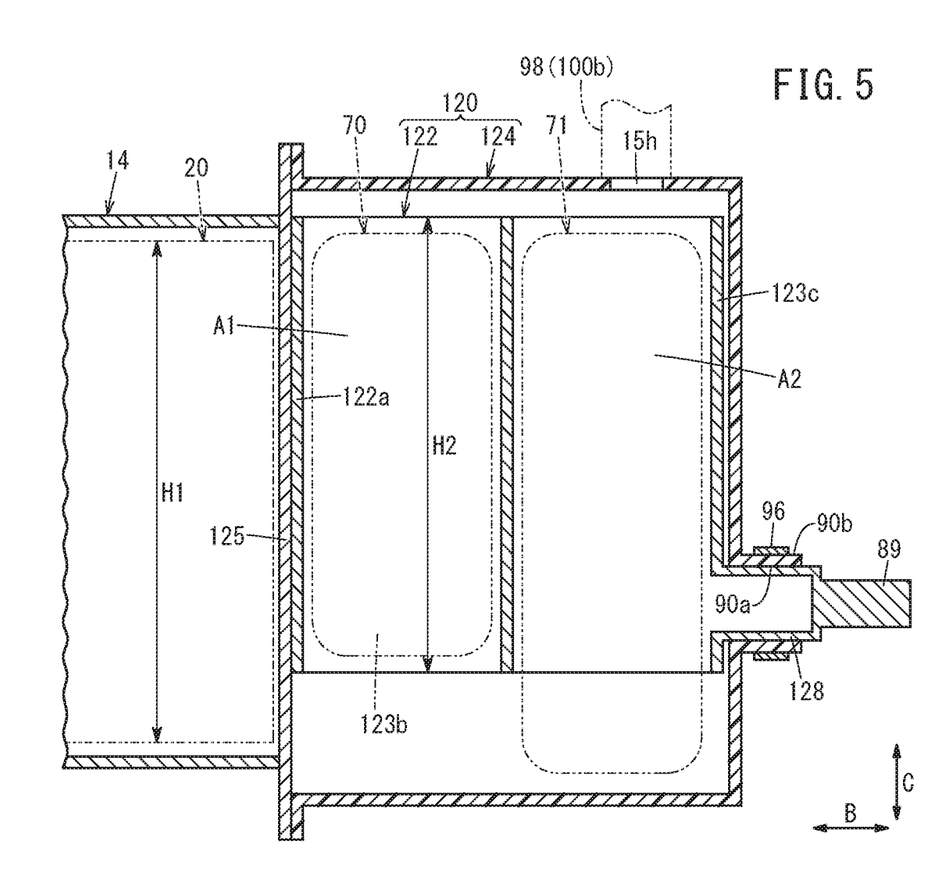
FIG. 5 is a view showing structure of an auxiliary device case according to another embodiment.

In an auxiliary device case 120 according to another embodiment shown in FIG. 5, a first case member 122 is, e.g., made of metal, and in the form of a frame supporting the fuel gas system device 70. The first case member 122 is fixed to an end plate 125 as part of the stack case 14, by fixing parts such as bolts. The height H2 of the first case member 122 is smaller than the height H1 of the fuel cell stack 20.

Figure 6:
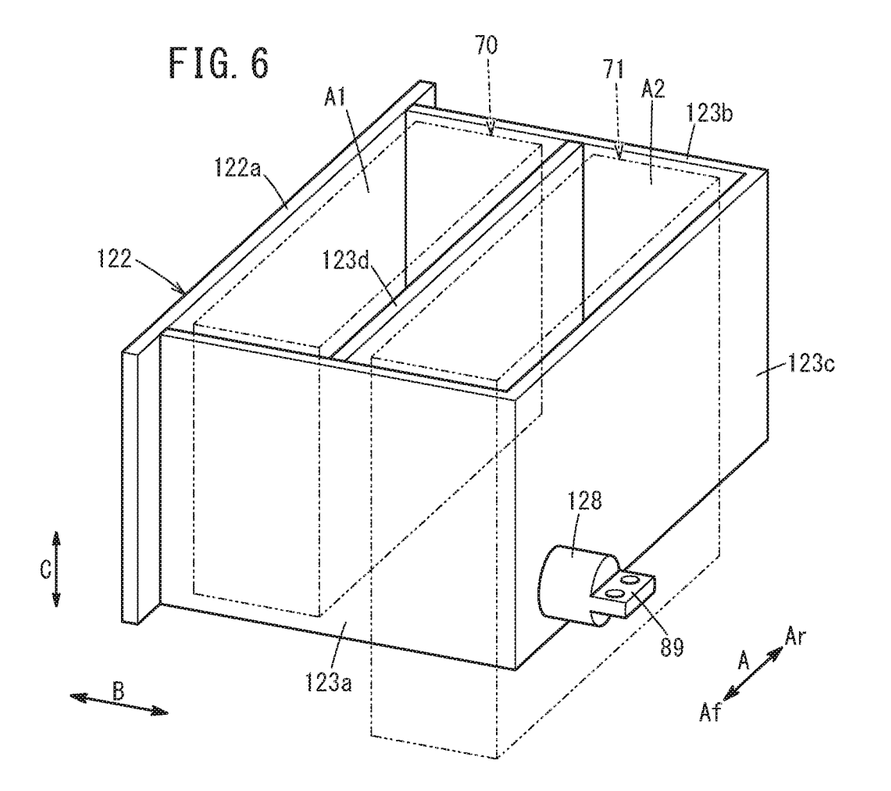
FIG. 6 is a perspective view showing a first case member of an auxiliary device case shown in FIG. 5.

As shown in FIG. 6, the first case member 122 includes a base plate 122a fixed to the end plate 125 (FIG. 5), a first wall 123a and a second wall 123b protruding from the base plate 122a, and spaced from each other in a horizontal direction, and a third wall 123c connecting the first wall 123a and the second wall 123b. The third wall 123c is disposed in parallel with the base plate 122a. A projection 128 having the mount 89 protrudes from the third wall 123c in the horizontal direction (indicated by the arrow B).

Further, the first case member 122 includes a fourth wall 123d disposed between the base plate 122a and the third wall 123c. The fourth wall 123d functions as a reinforcement member for increasing the rigidity of the first case member 122, and the fourth wall 123d is a partition wall which divides the inside the first case member 122 into a first area A1 and a second area A2. The first area A1 and the second area A2 are opened in the vertical direction (indicated by an arrow C). The fuel gas system device 70 is stored in the first area A1. The oxygen-containing gas system device 71 is partially stored in the second area A2. The oxygen-containing gas system device 71 is at least partially positioned outside (below) the first case member 122.

As shown in FIG. 5, a second case member 124 stores the first case member 122, and the second case member 124 is fixed to the stack case 14 in an air-tight manner. The second case member 124 is made of material having the specific gravity smaller than that of the first case member 122. For example, the second case member 124 is made of resin or rubber. The second case member 124 stores the first case member 122, and stores the fuel gas system device 70 and the oxygen-containing gas system device 71. An exhaust gas duct 98 is connected to the second case member 124. The position of the lower part of the second case member 124 is determined in a manner that the lower part of the second case member 124 interferes with structure around the auxiliary device case 120 when the auxiliary device case 120 moves relative to the vehicle body frame as a result of application of the external load.

In the auxiliary device case 120 having the above structure, since the first case member 122 has a frame shape, it becomes possible to reduce the size and/or weight of the first case member 122 to a greater extent. Accordingly, it becomes possible to reduce the weight of the fuel cell system 12 to a greater extent.

Figure 7:
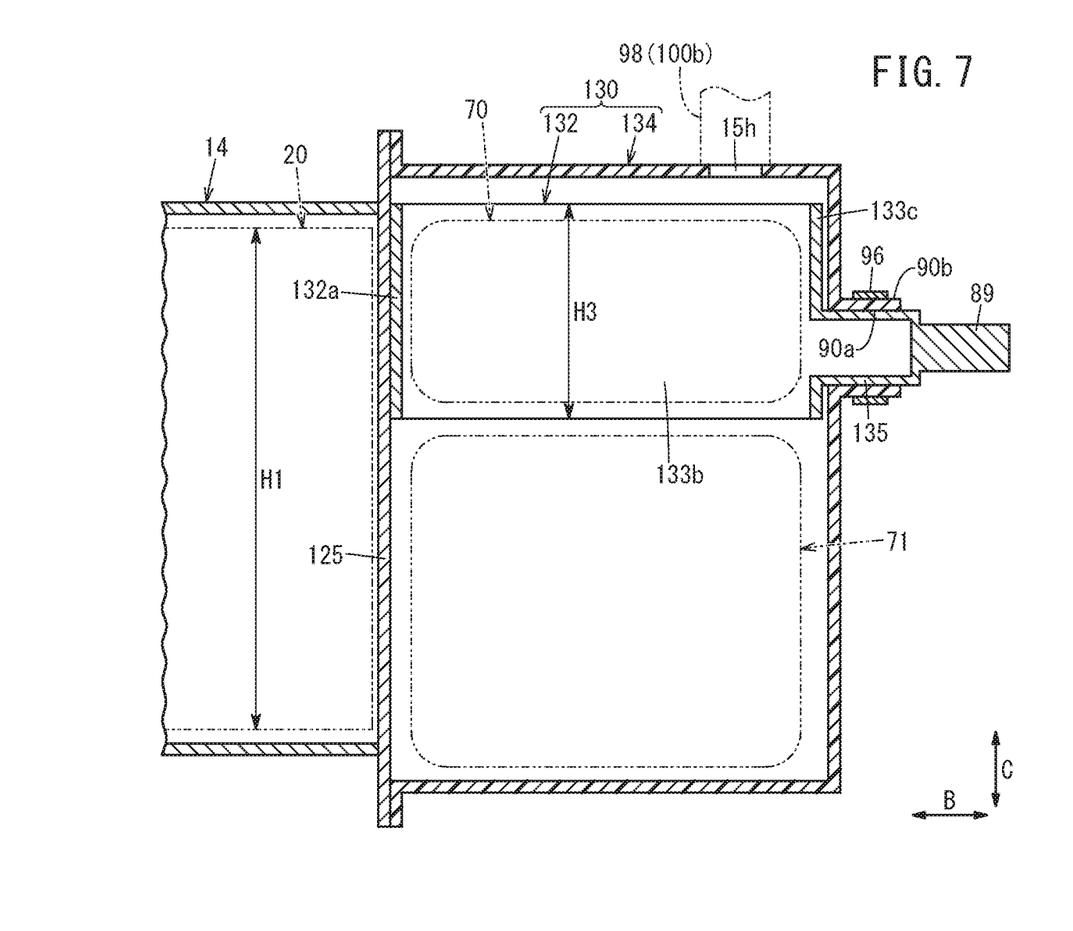
FIG. 7 is a view showing structure of an auxiliary device case according to still another embodiment.

In an auxiliary device case 130 according to still another embodiment shown in FIG. 7, a first case member 132 is, e.g., made of metal, and the first case member 132 is in the form of a frame supporting the fuel gas system device 70. The first case member 132 is fixed to the end plate 125 by fixing parts such as bolts. The height H3 of the first case member 132 is smaller than the height H1 of the fuel cell stack 20. The height H3 of the first case member 132 is smaller than the height H2 of the first case member 122 shown in FIG. 5. The height H3 of the first case member 132 is, for example, not more than the half of the height H1 of the fuel cell stack 20.

One of the fuel gas system device 70 and the oxygen-containing gas system device 71 is positioned below the other of the fuel gas system device 70 and the oxygen-containing gas system device 71. In FIG. 7, the fuel gas system device 70 is positioned above the oxygen-containing gas system device 71. That is, the oxygen-containing gas system device 71 is positioned below the fuel gas system device 70.

Figure 8:
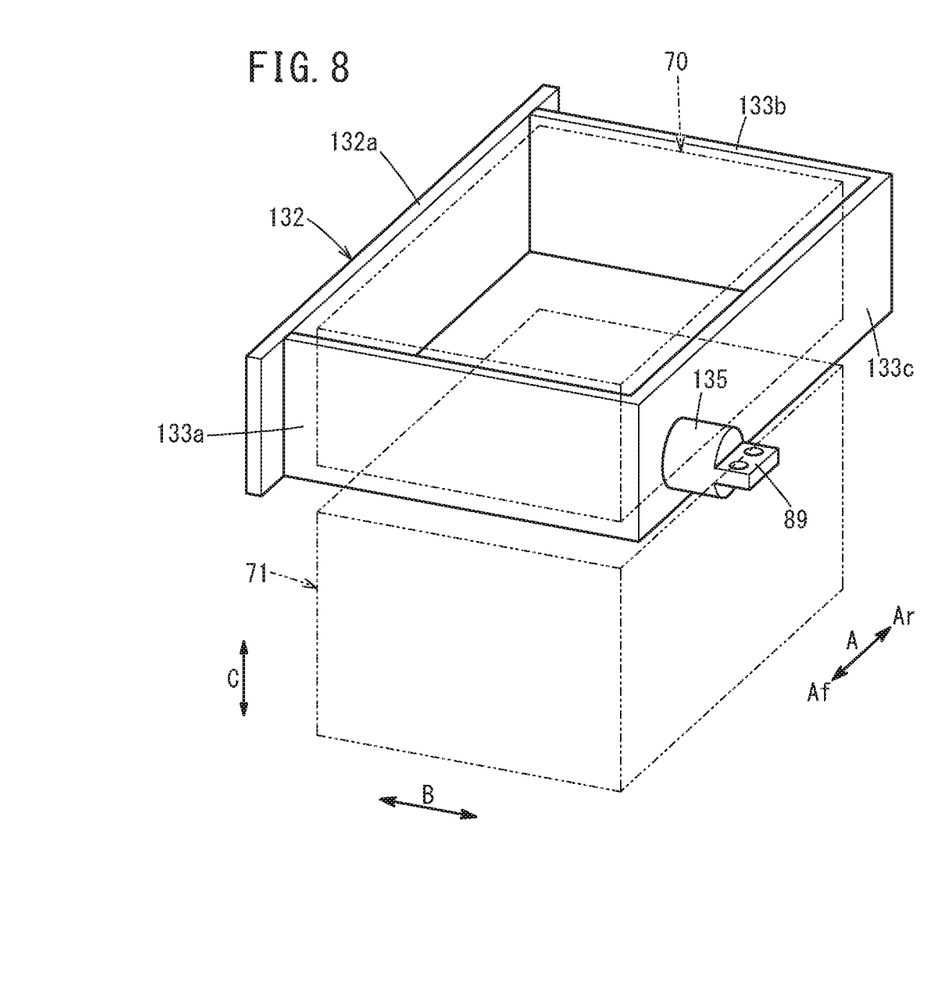
FIG. 8 is a perspective view showing a first case member of an auxiliary device case shown in FIG. 7.

As shown in FIG. 8, the first case member 132 includes a base plate 132a fixed to the end plate 125 (FIG. 7), a first wall 133a and a second wall 133b protruding from the base plate 132a, and spaced from each other in a horizontal direction, and a third wall 133c connecting the first wall 133a and the second wall 133b. The third wall 133c is disposed in parallel with the base plate 132a. The first case member 132 has a frame shape opened upward and downward, formed by the base plate 132a, the first wall 133a, the second wall 133b, and the third wall 133c.

The fuel gas system device 70 is disposed inside the frame shaped first case member 132. The oxygen-containing gas system device 71 is positioned below the first case member 132. Therefore, the oxygen-containing gas system device 71 is not surrounded by the first case member 132. A projection 135 having the mount 89 protrudes from the third wall 133c in the horizontal direction (indicated by an arrow B).

In FIG. 7, a second case member 134 has the same structure as the second case member 124 shown in FIG. 5, except that the position of the cylindrical wall 90b is different.

In the auxiliary device case 130, the first case member 132 has a frame shape, and one of the fuel gas system device 70 and the oxygen-containing gas system device 71 is positioned below the other of the fuel gas system device 70 and the oxygen-containing gas system device 71. Therefore, the height H3 of the first case member 132 surrounding the fuel gas system device 70 can be reduced comparatively. Accordingly, it is possible to reduce the size and weight of the first case member 132 effectively. Accordingly, it becomes possible to reduce the weight of the fuel cell system 12 to a greater extent.

The present invention is not limited the above embodiments. Various modifications can be made without departing from the gist of the present invention.

What is claimed is:

1. A fuel cell system comprising:
a fuel cell stack;
a stack case configured to store the fuel cell stack;
a fuel gas system device and an oxygen-containing gas system device as fuel cell auxiliary devices; and
an auxiliary device case fixed to the stack case and configured to store the fuel gas system device and the oxygen-containing gas system device, and having a ventilating function,
wherein the auxiliary device case comprises:
a first case member configured to cover the fuel gas system device in a manner to protect the fuel gas system device against an external load, and provided with a mount fixed to a vehicle body frame; and
a second case member made of material having specific gravity smaller than that of the first case member, and configured to cover at least the oxygen-containing gas system device, and
wherein the first case member includes a projection provided with the mount, and the projection penetrates through the second case member.

2. The fuel cell system according to claim 1, wherein the first case member is fixed to the stack case, and has a box shape configured to store the fuel gas system device; and
the second case member is fixed to the first case member in a manner to cover the oxygen-containing gas system device.

3. The fuel cell system according to claim 2, wherein the auxiliary device case is disposed adjacent to the stack case in a horizontal direction;
the fuel gas system device is disposed between the fuel cell stack and the oxygen-containing gas system device;
the first case member includes a cover body disposed between the oxygen-containing gas system device and the fuel gas system device, and the projection is configured to protrude from the cover body opposite from the stack case; and
the mount is provided at a protruding end of the projection.

4. A fuel cell system comprising:
a fuel cell stack;
a stack case configured to store the fuel cell stack;
a fuel gas system device and an oxygen-containing gas system device as fuel cell auxiliary devices; and
an auxiliary device case fixed to the stack case and configured to store the fuel gas system device and the oxygen-containing gas system device, and having a ventilating function,
wherein the auxiliary device case comprises:
a first case member configured to cover the fuel gas system device in a manner to protect the fuel gas system device against an external load, and provided with a mount fixed to a vehicle body frame; and
a second case member made of material having specific gravity smaller than that of the first case member, and configured to cover at least the oxygen-containing gas system device,
wherein the first case member is fixed to the stack case, and has a box shape configured to store the fuel gas system device; and
the second case member is fixed to the first case member in a manner to cover the oxygen-containing gas system device,
wherein the auxiliary device case is disposed adjacent to the stack case;
the fuel gas system device is disposed between the fuel cell stack and the oxygen-containing gas system device;
the first case member includes a cover body disposed between the oxygen-containing gas system device and the fuel gas system device, and a projection configured to protrude from the cover body opposite from the stack case; and
the mount is provided at a protruding end of the projection, and
wherein part of the projection is partially disposed in the second cover member.

5. The fuel cell system according to claim 1, wherein the first case member is in a form of a frame configured to support the fuel gas system device; and
the second case member is configured to store the first case member, and store the fuel gas system device and the oxygen-containing gas system device, and the second case member is fixed to the stack case.

6. The fuel cell system according to claim 5, wherein the auxiliary device case is disposed adjacent to the stack case;
the fuel gas system device is disposed between the fuel cell stack and the oxygen-containing gas system device; and
the second case member surrounds the fuel gas system device and the oxygen-containing gas system device.

7. The fuel cell system according to claim 6, wherein the first case member comprises:
a base plate fixed to an end plate as part of the stack case;
a first wall and a second wall protruding from the base plate, and spaced from each other;
a third wall configured to connect the first wall and the second wall; and a fourth wall disposed between the base plate and the third wall,
  wherein the fourth wall divides inside of the first case member into a first area storing the fuel gas system device and a second area storing the oxygen-containing gas system device.

8. The fuel cell system according to claim 7, wherein the first case member includes the projection protruding from the third wall, and the mount is provided at a protruding end of the projection.

9. The fuel cell system according to claim 5, wherein the auxiliary device case is disposed adjacent to the stack case in the horizontal direction, and
  one of the fuel gas system device and the oxygen-containing gas system device is positioned below another of the fuel gas system device and the oxygen-containing gas system device.

10. The fuel cell system according to claim 9, wherein the first case member includes a base plate fixed to an end plate as part of the stack case, a first wall and a second wall protruding from the base plate, and spaced from each other, and a third wall configured to connect the first wall and the second wall;
  the first case member has a frame shape formed by the base plate, the first wall, the second wall, and the third wall; and
  the fuel gas system device is disposed inside the first case member having the frame shape.

11. The fuel cell system according to claim 1, wherein the first case member is made of metal, and the second case member is made of rubber or resin.

12. A fuel cell system comprising:
  a fuel cell stack;
  a stack case configured to store the fuel cell stack;
  a fuel gas system device and an oxygen-containing gas system device as fuel cell auxiliary devices; and
  an auxiliary device case fixed to the stack case and configured to store the fuel gas system device and the oxygen-containing gas system device, and having a ventilating function,
  wherein the auxiliary device case comprises:
  a first case member configured to cover the fuel gas system device in a manner to protect the fuel gas system device against an external load, and provided with a mount fixed to a vehicle body frame; and
  a second case member made of material having specific gravity smaller than that of the first case member, and configured to cover at least the oxygen-containing gas system device,
  wherein the first case member includes a projection provided with the mount;
  the second case member includes an insertion hole into which the projection is inserted, and
  an air-tight seal is formed between the projection and a cylindrical wall forming the insertion hole.

13. The fuel cell system according to claim 1, wherein the second case member has low rigidity in comparison with the first case member, and a position of the second case member is determined in a manner that the second case member interferes with structure around the auxiliary device case when the auxiliary device case moves relative to the vehicle body frame as a result of application of the external load.

* * * * *